(12) United States Patent
Shin et al.

(10) Patent No.: US 8,371,563 B2
(45) Date of Patent: Feb. 12, 2013

(54) JIG DEVICE

(75) Inventors: Minkyu Shin, Gyeonggi-do (KR);
Byung Chang Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 811 days.

(21) Appl. No.: 12/533,166

(22) Filed: Jul. 31, 2009

(65) Prior Publication Data
US 2010/0109221 A1 May 6, 2010

(30) Foreign Application Priority Data

Oct. 30, 2008 (KR) ........................ 10-2008-0107182

(51) Int. Cl.
| | |
|---|---|
| B23Q 3/00 | (2006.01) |
| B23Q 17/00 | (2006.01) |
| B25B 1/00 | (2006.01) |
| B25B 27/14 | (2006.01) |
| B24B 1/00 | (2006.01) |
| B24B 7/19 | (2006.01) |
| B24B 7/30 | (2006.01) |
| B65G 47/84 | (2006.01) |
| B65G 49/00 | (2006.01) |

(52) U.S. Cl. ........ 269/10; 29/407.05; 29/281.5; 451/41; 198/465.1

(58) Field of Classification Search .................... 269/10; 29/407.05, 281.5, 705, 434, 888.061; 451/41; 198/465.1, 364.1, 379; 123/41.74
See application file for complete search history.

(56) References Cited

U.S. PATENT DOCUMENTS

| | | | | |
|---|---|---|---|---|
| 4,598,816 | A * | 7/1986 | Kutzli et al. | 198/465.1 |
| 5,105,516 | A * | 4/1992 | Enomoto et al. | 29/281.5 |
| 5,150,506 | A * | 9/1992 | Kotake et al. | 29/407.05 |
| 6,336,845 | B1 * | 1/2002 | Engdahl et al. | 451/41 |
| 2006/0213465 | A1* | 9/2006 | Sunada et al. | 123/41.84 |
| 2007/0009345 | A1* | 1/2007 | Hall et al. | 414/222.01 |

FOREIGN PATENT DOCUMENTS

| | | |
|---|---|---|
| CN | 201105381 Y | 8/2008 |
| JP | 03-256626 A | 11/1991 |
| JP | 2003-181731 A | 7/2003 |
| KR | 10-2008-0054731 A | 6/2008 |

* cited by examiner

*Primary Examiner* — Lee D Wilson
*Assistant Examiner* — Alvin Grant
(74) *Attorney, Agent, or Firm* — Edwards Wildman Palmer LLP; Peter F. Corless

(57) ABSTRACT

An upper clamping unit and a sub-clamping unit are respectively configured on the upper center of the main frame and on both sides of the front of the mounting portion, a side surface pad unit and a base surface pad unit are configured on one side and the front surface portion of the main frame so as to fix the upper part of a casting block, and the casting block is supplied from the upper portion through a gantry loader such that a separate transfer device is not necessary to make the fabrication process reasonable.

9 Claims, 7 Drawing Sheets

JIG DEVICE

CROSS-REFERENCE TO RELATED APPLICATION

This application claims priority to and the benefit of Korean Patent Application No. 10-2008-0107182, filed on Oct. 30, 2008, the entire contents of which are incorporated herein by reference.

BACKGROUND OF THE INVENTION (a) Field of the Invention

The present invention relates to a jig device. More particularly, the present invention relates to a jig device for use in fabrication of a casting block.

(b) Description of the Related Art

Generally, a casting block such as a cylinder block is fabricated through a die casting process in which a molten metal is injected into a steel mold that is mechanically accurately cut to have a required shape therein.

The casting block that is fabricated through the die casting process has accurate dimensions such that a finishing process is almost not necessary and the mechanical properties thereof are good. Typically, an alloy of zinc, aluminum, tin, copper, and so on is used as a metal material, air pressure, water pressure, or hydraulic pressure is used to inject the metal, and then the metal is cooled to a steel product.

However, as shown FIG. 1, a jig device is used to fix a casting block so as to cut one portion of the casting block, which is manufactured through the die casting process, based on a base surface.

In the conventional jig device for fabrication, a mounting portion 103 on which the casting block (not shown) is mounted is formed in the front of the main frame 101, and a plurality of pads (P) that are operated by hydraulic cylinders are disposed on the mounting portion 103 and the front surface portion 105.

Also, a main clamping unit 109 is formed on the center of the upper frame 107 that is configured on the upper portion of the main frame 101 to fix the upper portion of the casting block.

The operation of the jig device for fabrication is as follows. First, a transfer device (not shown) is used to transfer and mount the casting block on the mounting portion 103, second, the base boss of the casting block contacts the pad (P) to confirm the mounting condition thereof, and third, the casting block is fixed through the main clamping unit 109 such that a machining center (not shown) can securely cut a specific part thereof.

However, in the jig device for fabrication, the upper frame 107 and the main clamping unit 109 are disposed in the upper center thereof such that the transfer device such as a gantry loader cannot mount the casting block from above owing to the spatial interference, it is hard to achieve a reasonable process, and an additional separate transfer device has to be used, in which case the fabrication cost is increased the flexibility of the manufacturing is lowered.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a jig device for fabrication in which an upper clamping unit and a sub-clamping unit are respectively configured on the upper center of the main frame and on both sides of the front of the mounting portion, a side surface pad unit and a base surface pad unit are configured on one side and the front surface portion of the main frame so as to fix the upper part of the casting block, and the casting block is supplied from the upper portion through a gantry loader such that a separate transfer device is not necessary.

According to an embodiment of the present invention, a jig device for fixing a casting block so as to cut it based on a base surface thereof may include a main frame that forms a mounting portion and a front surface portion respectively corresponding to the lower and rear of the casting block, a center guider that is formed in the center of the mounting portion to support the center of the lower of the casting block, a base surface plate unit that is configured on the upper and lower center of the front surface portion to support the upper side and the lower side of the rear surface as a base surface through a cylinder, a side surface pad unit that is configured on one side of the main frame to support one side surface of the casting block through a cylinder, a lower lifting pad unit that is configured on the mounting portion respectively corresponding to both sides of the rear and front of the center guider to lower and raise the casting block through a cylinder, an upper clamping unit that is configured respectively at both sides of the upper center of the front surface portion to fix both sides of the upper portion of the casting block through a cylinder and a hinge structure, a lower clamping unit that is configured on the mounting portion corresponding to both sides of the center guider to fix both sides of the lower portion of the casting block through a cylinder, a sub clamping unit that is configured respectively at both sides of the front of the mounting portion to fix both sides of the front upper surface of the casting block through a cylinder, and a base surface pad unit that is configured at one side of the front surface portion to determine the contacting condition with the casting block according to the variation of air pressure.

The center guider may include a center block that is disposed in the middle of the mounting portion, and a guide pad that is respectively mounted on both sides of the upper part of the center block.

The base surface plate unit may include a base surface plate cylinder that is mounted on the rear surface of the main frame, upper and lower back/forth plates that are disposed on the upper and lower center of the front surface portion to be connected to an operating rod of the base surface plate cylinder through a connecting block inside the main frame such that it can move back and forth, and a plurality of shaft-shaped base surface dogs that are configured in the front of the upper and lower back/forth plates to support the upper and lower parts of the rear surface of the casting block.

The side surface pad unit may include a side pad cylinder that is mounted through a cylinder bracket of the one side of the main frame, and a side pad that is mounted on the front end of the operating rod of the side pad cylinder to support the one side surface of the casting block.

The lower lifting pad unit may include both-side lifting cylinders that are respectively mounted at both sides of the front and rear of the mounting portion of the main frame, and a plurality of lower lifting pads that are configured at the mounting portion corresponding to both sides of the front and rear of the center guider to raise and lower the casting block through a cam operation according to the back and forth operation of the respective lifting cylinder in the main frame.

The upper clamping unit may include an upper clamping cylinder that is configured at the center of the upper portion of the main frame, a both-side clamping shaft that is mounted inside the upper center of the front surface portion of the main frame such that the rear end thereof is connected to the front end of the operating rod of the upper clamping cylinder through a connecting bracket, and both-side upper dampers that are connected to the front end of the both-side clamping shaft through a link structure to fix both sides of the upper part of the casting block through a hinge operation in a mounted position.

The lower clamping unit may include a lower clamping cylinder that is mounted at the lower center of the rear side of the main frame, and both-side lower dampers that are configured on the mounting portion corresponding to both sides of the center guider to be operated inside the main frame by the lower clamping cylinder so as to fix both sides of the casing block.

The sub-clamping unit may include both-side sub clamping cylinders that are mounted on both sides of the front of the mounting portion, and both-side sub-clampers that are mounted on the front end of the operating rod of the respective sub clamping cylinder to fix both sides of the front upper of the casting block.

The base surface pad unit may include a mounting shaft that penetrates through the center of the front surface to the rear and has an air pressure hole formed along the axis thereof and an exhaust hole formed at the front end thereof, a nozzle that is mounted at the center of the front end of the mounting shaft and has a nozzle air pressure hole therein connected to the air pressure hole and a nozzle exhaust hole thereinconnected to the exhaust hole, a cover that is mounted on the front center of the end of the mounting shaft to cover the nozzle, a pad shaft that penetrates the center of the cover and has the rear end thereof corresponding to the nozzle air pressure hole of the nozzle and the front end thereof corresponding to the rear of the casting block, and a return spring that supports the pad shaft frontward in the cover.

As stated above, in a jig device for fabrication according to the present invention, an upper clamping unit and a sub-clamping unit are respectively configured on the upper center of the main frame and on both sides of the front of the mounting portion, a side surface pad unit and a base surface pad unit are configured on one side and the front surface portion of the main frame so as to fix the upper part of the casting block, and the casting block is supplied from the upper portion through a gantry loader, and accordingly a separate transfer device is not necessary.

The accompanying drawings are used for describing an exemplary embodiment of the present invention, and it is to be understood that the invention is not limited to the accompanying drawings. It is also to be understood that various equivalents and variants may exist at the filing date of this specification.

DETAILED DESCRIPTION OF THE EMBODIMENTS

An exemplary embodiment of the present invention will hereinafter be described in detail with reference to the accompanying drawings.

Figure 1:
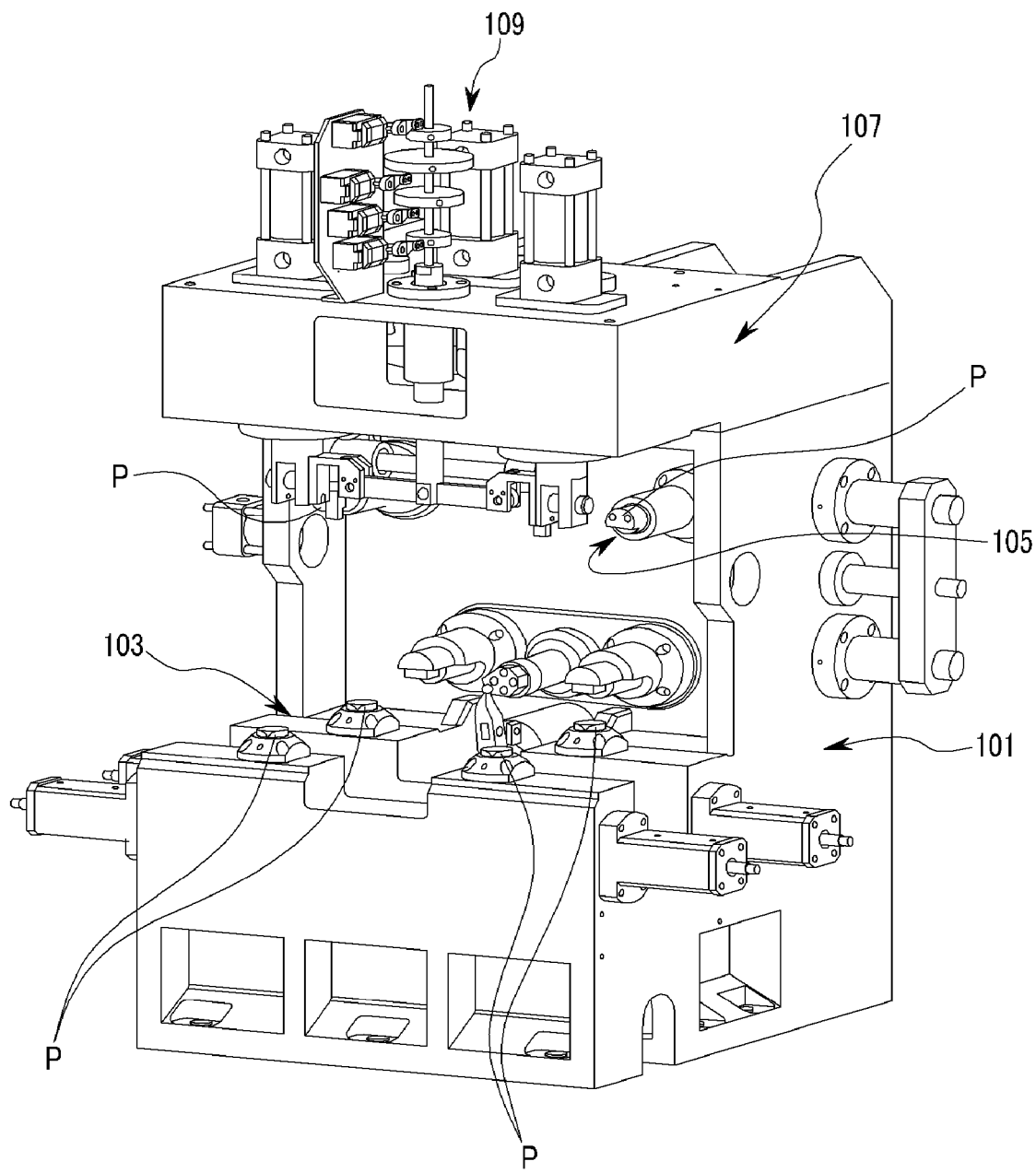
FIG. 1 is a perspective view of a jig device for fabrication according to the conventional art.
Figure 2:
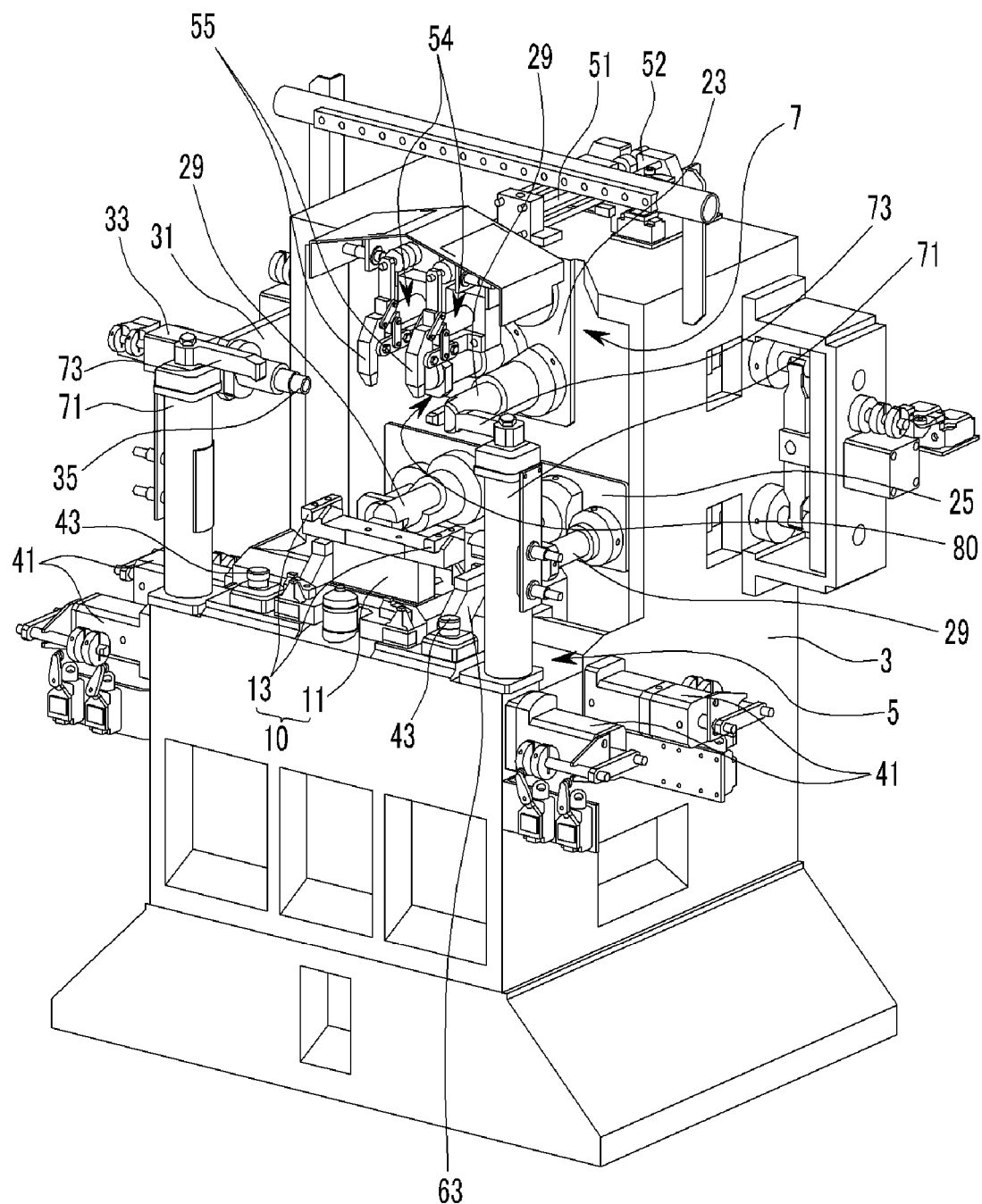
FIG. 2 is a front perspective view of a jig device for fabrication according to an exemplary embodiment of the present invention.
Figure 3:
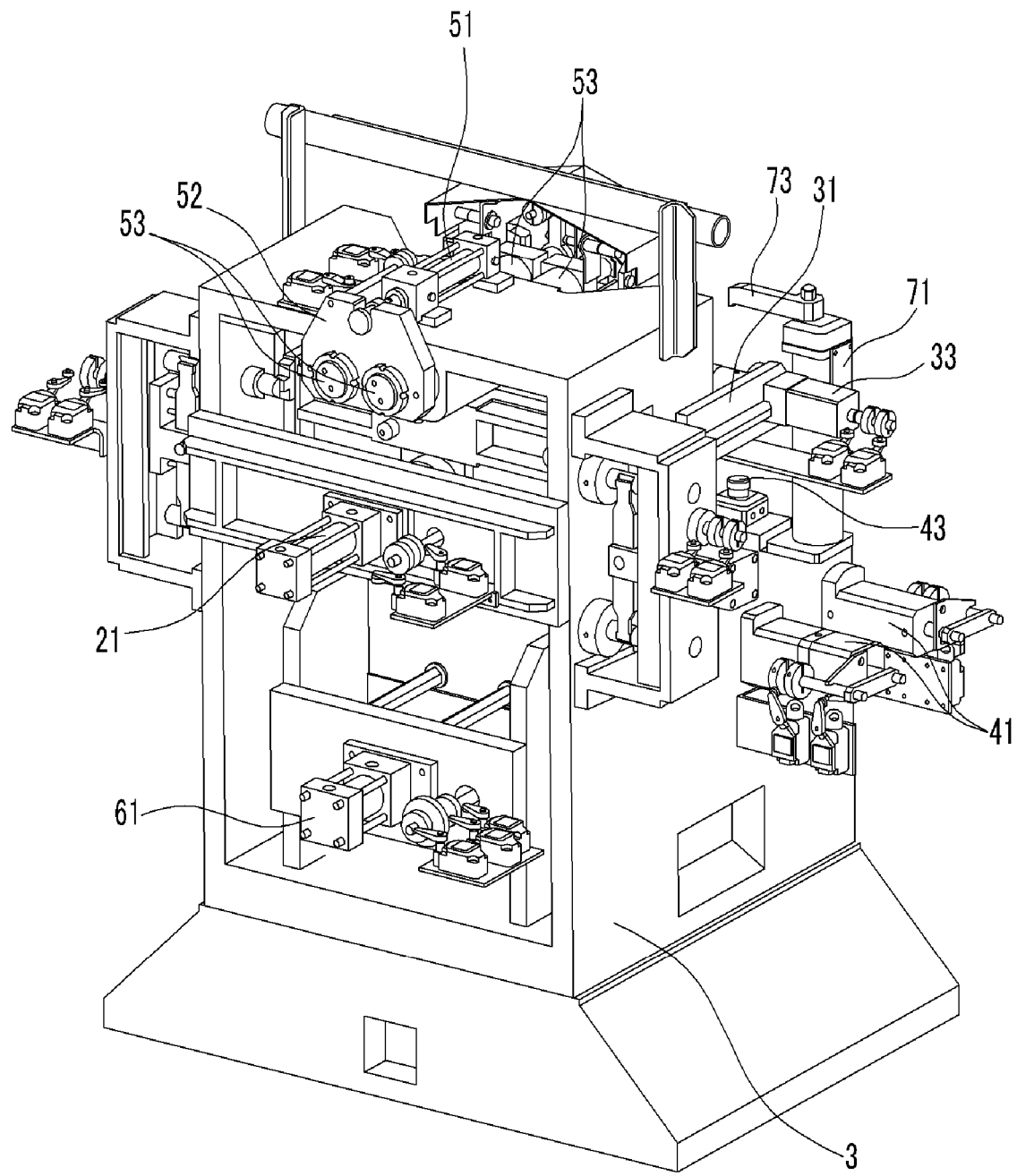
FIG. 3 is a rear perspective view of a jig device for fabrication according to an exemplary embodiment of the present invention.
Figure 4:
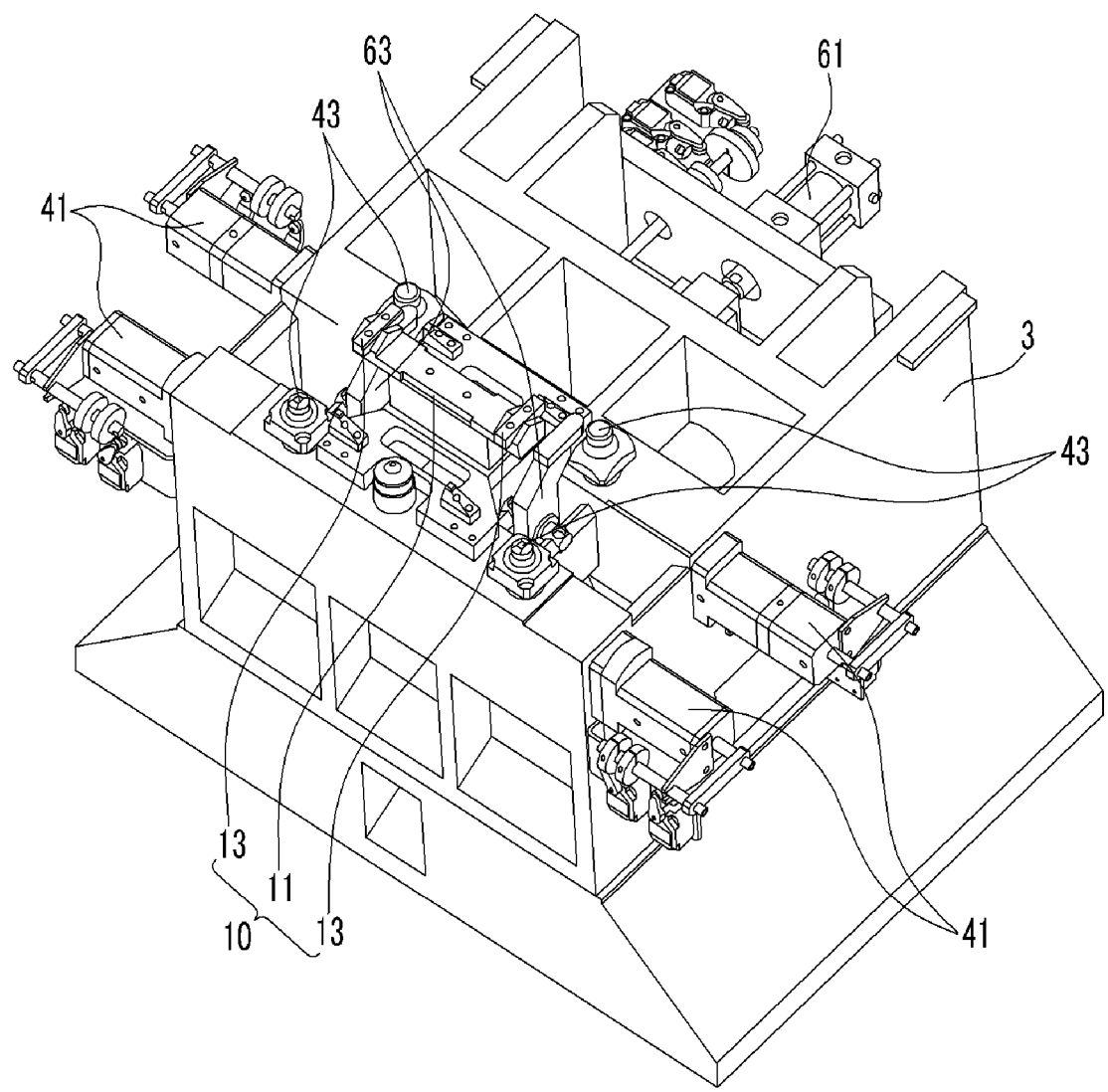
FIG. 4 is an upper exploded perspective view of a jig device for fabrication according to an exemplary embodiment of the present invention.

FIG. 2 and FIG. 3 are front and rear perspective views of a jig device for fabrication according to an exemplary embodiment of the present invention, and FIG. 4 is an upper exploded perspective view of a jig device for fabrication according to an exemplary embodiment of the present invention.

Figure 6:
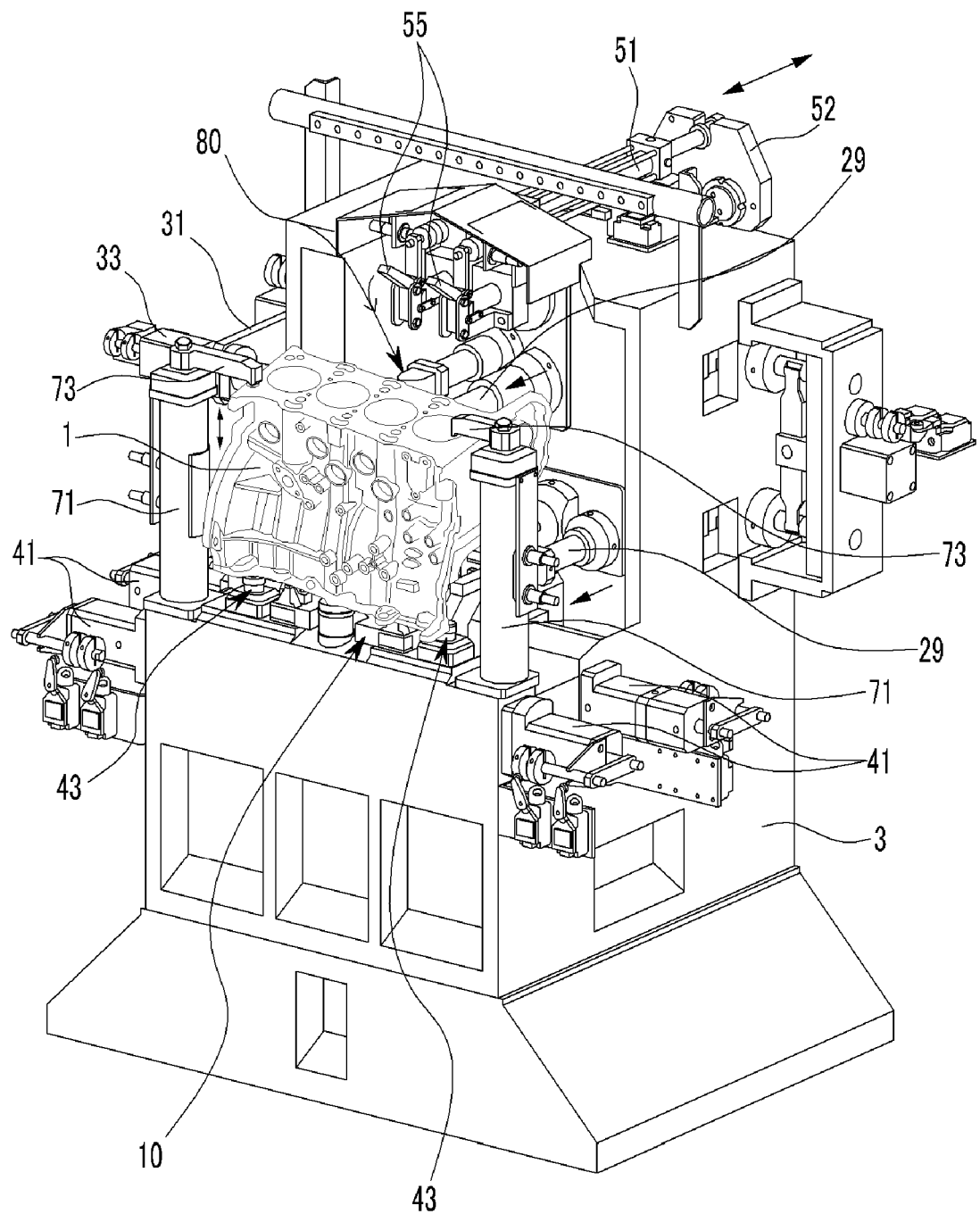
FIG. 6 is a perspective view showing a condition of using a jig device for fabrication according to an exemplary embodiment of the present invention.
Figure 7:
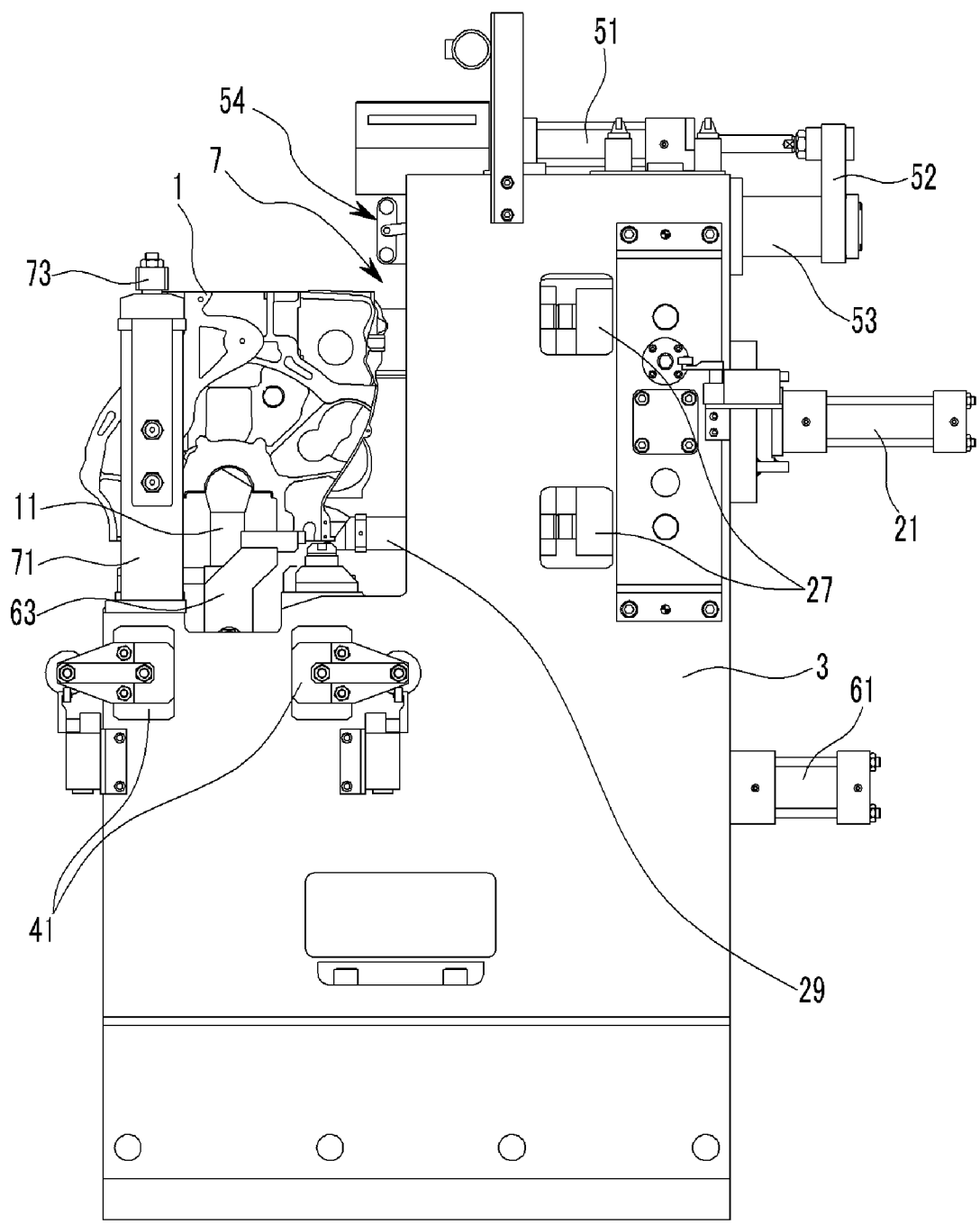
FIG. 7 is a side view showing a condition of using a jig device for fabrication according to an exemplary embodiment of the present invention.

A jig device for fabrication that is to be cut by a machining center (not shown) according the present exemplary embodiment, as shown FIG. 6 and FIG. 7, includes a main frame 3.

As shown in FIG. 2 and FIG. 3, a mounting portion 5 and a front surface portion 7 are respectively formed in the front of the main frame 3 corresponding to the lower and rear of a casting block 1.

A center guider 10 is provided in the center of the mounting portion 5, as shown in FIG. 2 and FIG. 4, a center block 11 is mounted on the center of the mounting portion 5 such that the center guider 10 supports the center of the lower part of the casting block 1, and a guide pad 13 is mounted on both sides of the upper part of the center block 11.

A base surface plate unit is provided at the upper and lower center of the front surface portion 7 to support the rear upper side and lower side of the casting block 1 as a base surface through a cylinder operation, and as shown in FIG. 2, FIG. 3, and FIG. 7, the base surface plate unit includes a base surface plate cylinder 21 that is mounted on the rear surface of the main frame 3 and upper and lower back/forth plates 23 and 25 that are disposed at the upper and lower center of the front surface portion 7 to be connected to the operating rod of the base surface plate cylinder 21 through a connecting block 27 inside the main frame 3 such that it can move back and forth.

Also, in the front surface of the upper and lower back/forth plates 23 and 25, a plurality of base surface dogs 29 having a shaft shape are disposed to support the upper and lower sides of the rear of the casting block 1 as a base surface.

Also, a side surface pad unit is configured at one side of the main frame 3 to support one side of the casing block 1 by a cylinder operation, and as shown in FIG. 2, the side surface pad unit includes a side pad cylinder 33 that is mounted on a cylinder bracket 31 of one side of the main frame 3 and a side pad 35 that is disposed in the front end of the operating rod of the side pad cylinder 33 to support one side of the casting block 1.

A lower lifting pad unit is configured in the mounting portion 5 corresponding to both sides of the front and rear of the center guider 10 to raise and lower the casting block 1 by a cylinder operation, and as shown in FIG. 4, the lower lifting pad unit includes two both-side lifting cylinders 41 that are respectively mounted at both sides of the front and rear of the mounting portion 5 of the main frame 3 and two lower lifting pads 43 that are configured on the mounting portion 5 corresponding to both sides of the front and rear of the center guider 10.

Here, the lower lifting pad is cam-operated inside the main frame 3 according to the back and forth movement of the respective lifting cylinders 41 to raise and lower the casting block 1, and the principle of the above cam operation is known in the art, so detailed descriptions will be omitted.

Also, an upper clamping unit is configured at both sides of the upper center of the front surface portion 7 to fix both sides of the upper part of the casting block 1 through a hinge driven by a cylinder, and as shown in FIG. 2, FIG. 3, and FIG. 7, the upper clamping unit includes an upper clamping cylinder 51 that is mounted on the upper center of the main frame 3 and both-side clamping shafts 53 that are mounted inside the upper center of the front surface portion 7 of the main frame 3.

The rear end of the both-side clamping shaft 53 is connected to the front end of the operating rod of the upper clamping cylinder 51 through a connecting bracket 52. Also, a both-side upper damper 55 is mounted on both sides of the upper part of the front surface portion 7 of the main frame 3 through a link 54.

Here, the front end of the both-side clamping shaft 53 is connected to one part of the both-side upper damper 55 to operate the both-side upper damper 55 through a hinge mechanism such that both sides the upper part of the casting block 1 are fixed.

Further, a lower clamping unit is configured at the mounting portion 5 corresponding to both sides of the center guider 10 to fix both sides of the lower part of the casting block 1 through a cylinder operation, and as shown in FIG. 4, the lower clamping unit includes a lower clamping cylinder 61 that is mounted on the lower center of the rear of the main frame 3 and a both-side lower damper 63 that is configured on the mounting portion 5 corresponding to both sides of the center guider 10 to be cam-operated by the operation of the lower clamping cylinder 61 inside the main frame 3 so as to fix both sides of the lower portion of the casting block 1.

Also, a sub-clamping unit is respectively configured at both sides of the front of the mounting portion 5 to fix the upper surface of the front of the casting block 1 through a cylinder operation, and as shown in FIG. 2, the sub-clamping unit includes a sub-clamping cylinder 71 that is respectively set up at both sides of the front of the mounting portion 5.

A sub-clamper 73 is configured on the respective front end of the operating rod of the both-side sub-clamping cylinder 71 to fix both sides of the front upper part of the casting block 1.

Figure 5:
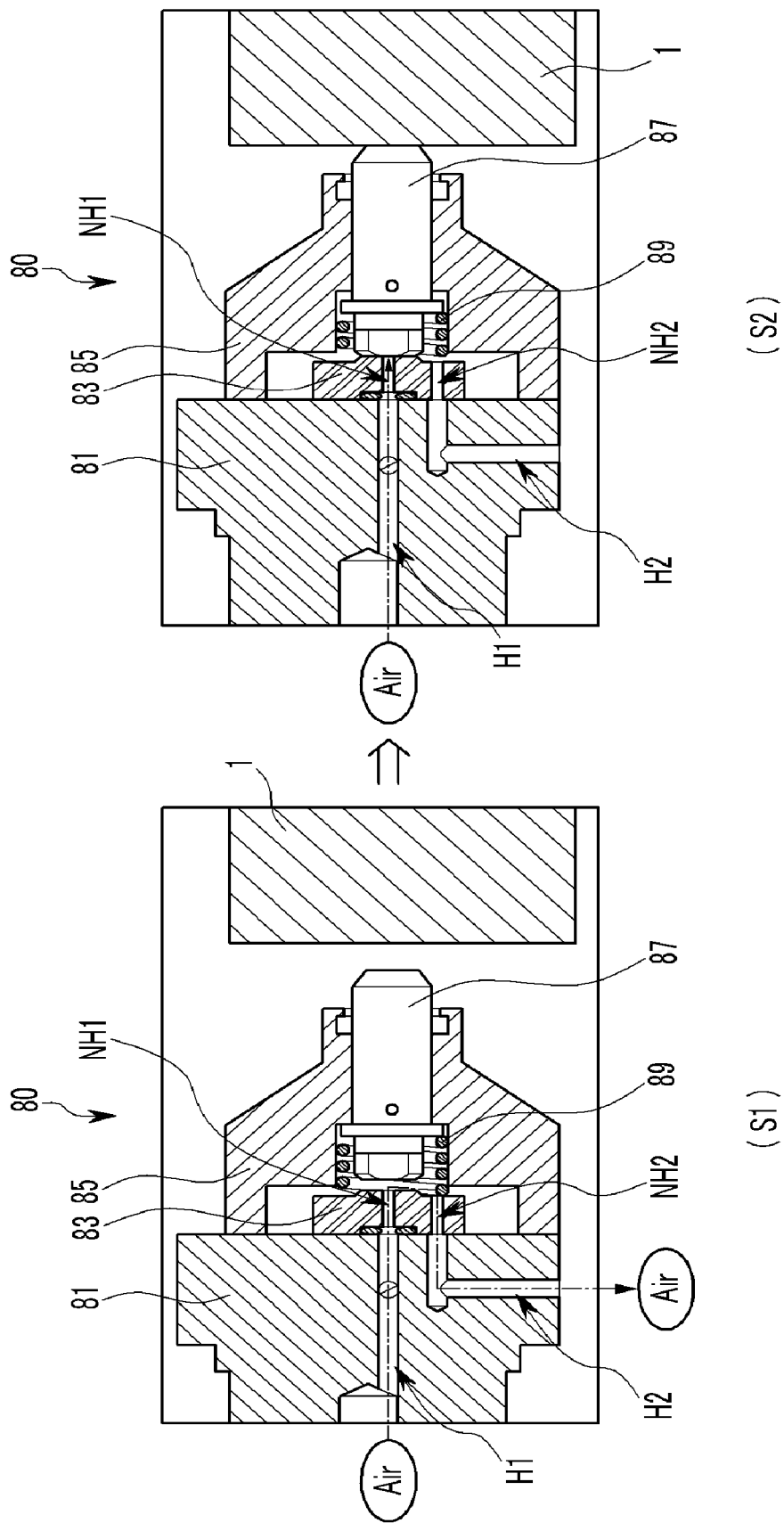
FIG. 5 is a cross-sectional view showing an operational condition of a base surface pad unit that is applied in a jig device for fabrication according to an exemplary embodiment of the present invention.

A base surface pad unit 80 is configured at one portion of the front surface portion 7 to determine the contact condition with the casting block 1 corresponding to a variation of air pressure, and as shown in FIG. 2 and FIG. 5, the base surface pad unit 80 includes a mounting shaft 81 that penetrates the center of the front surface portion 7 of the main frame 3 to the rear surface.

An air pressure hole H1 is formed inside the mounting shaft 81 along the axis thereof, and an exhaust hole H2 is formed inside the front end thereof.

A nozzle 83 is mounted at the center of the front end surface of the mounting shaft 81, and a nozzle air pressure hole NH1 that is connected to the air pressure hole H1 and a nozzle exhaust hole NH2 that is connected to the exhaust hole H2 are formed inside the nozzle 83.

Further, a cover 85 is disposed at the front end surface of the mounting shaft 81 to cover the nozzle 83.

A pad shaft 87 is disposed inside the cover to penetrate the center of the cover 85, and the rear end of the pad shaft 87 corresponds to the nozzle air pressure hole NH1 of the nozzle 83 and the front end thereof corresponds to the rear surface of the casting block 1.

In addition, the pad shaft 87 is supported frontward by a return spring 89 inside the cover 85.

Accordingly, the operating process of the jig device for fabrication having the above structure will be explained referring to FIG. 6 and FIG. 7. First, the casting block 1 that is to be processed is supplied from above by a gantry loader (not shown), and it is disposed on the center guider 10 that is configured on the mounting portion 5 of the main frame 3.

Then, the base surface plate cylinder 21 moves the base surface dog 29 forward such that the rear upper and lower part of the casting block 1 is supported as a base surface.

In this condition, the side pad cylinder 33 moves the side pad 35 forward such that one side of the casting block 1 is supported by the side pad.

Subsequently, the both-side lifting cylinders 41 are operated to raise the respective lower lifting pads 43 such that the position of the casting block 1 of the mounting portion 5 can be adjusted.

Next, the upper clamping cylinder 51 and the lower clamping cylinder 61 are operated to move the upper damper 55 and the lower damper 63 forward such that both sides of the upper and lower part of the casting block 1 are fixed.

As stated above, in a condition in which the casting block 1 is fixed, the both-side lifting cylinders 41 are again operated to raise the lower lifting pads 43 such that the casting block 1 of the mounting portion 5 is securely fixed.

In this condition, the both-side sub-clamping cylinder 71 is operated to move the sub-clamping cylinder 71 backward such that the both-side sub-clamper 73 draws both sides of the front upper part of the casting block 1 in a lower direction to complete the operation of fixing the casting block 1.

As stated above, if the casting block 1 is completely fixed, the air is supplied to the base surface pad unit 80 to confirm the contact condition of the casting block 1.

That is, the operation principle of the base surface pad unit 80 is as follows, as shown in "S1" of FIG. 5. When the casting block 1 is not accurately disposed on the mounting portion 5, the pad shaft 87 sustains its advanced condition by the elastic force of the return spring 89, and if the air is supplied through the air pressure hole H1 of the mounting shaft 81 in the above condition, the air passes through the nozzle air pressure hole NH1 and the nozzle exhaust hole NH2 to be exhausted through the exhaust hole H2, and accordingly the pressure inside the air pressure hole H1 of the mounting shaft 81 does not vary.

Thus, if there is no variation of the pressure inside the air pressure hole H1, it is determined that the casting block 1 is not exactly disposed on the mounting portion 5.

Meanwhile, in a case in which the casting block 1 is accurately disposed on the mounting portion 5 as shown in "S2" of FIG. 5, the pad shaft 87 is moved backward by the casting block 1 such that the front end thereof isolates the nozzle air pressure hole NH1 of the nozzle 83, and if the air is supplied through the air pressure hole H1 of the mounting shaft 81 in this condition, the air pressure inside the air pressure hole H1 is increased.

As described, if there is a pressure increase inside the air pressure hole H1, it is determined that the casting block 1 is accurately disposed on the mounting portion 5.

Accordingly, the casting block 1 is accurately disposed on the mounting portion 5 of a jig device for fabrication to be securely fixed according to the present exemplary embodiment such that a specific part thereof can be cut through a machining center (not shown) to be able to satisfy a strict mechanical tolerance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A jig device for fixing a casting block so as to cut it based on a base surface thereof, comprising:
    a main frame that forms a mounting portion and a front surface portion respectively corresponding to a lower part and a rear part of the casting block;
    a center guider that is formed in the center of the mounting portion to support the center of the lower part of the casting block;
    a base surface plate unit that is configured on the upper and lower center of the front surface portion to support the upper side and the lower side of the rear surface as a base surface through a cylinder, wherein the base surface plate includes a base surface plate cylinder, one or more upper and lower back/forth plates and a plurality of shaft-shape base surface dogs;
    a side surface pad unit that is configured on one side of the main frame to support one side surface of the casting block through a cylinder, wherein the side surface pad unit includes a side pad cylinder and a side pad;
    a lower lifting pad unit that is configured on the mounting portion respectively corresponding to both sides of the rear and front of the center guider to lower and raise the casting block through a cylinder;
    an upper clamping unit including an upper clamping cylinder, a both side clamping shaft and a both side upper clamper disposed respectively on both sides of the upper center of the front surface portion to fix both sides of the upper portion of the casting block through a cylinder and a hinge structure and wherein the both side clamper is configured to move forwards once the casting block is loaded from above therein;
    a lower clamping unit that is configured on the mounting portion corresponding to both sides of the center guider to fix both sides of the lower portion of the casting block through a cylinder;
    a sub clamping unit that is configured respectively at both sides of the front of the mounting portion to fix both sides of the front upper surface of the casting block through a cylinder, wherein the sub clamping unit includes a sub clamping cylinder and sub clamper; and
    a base surface pad unit that is configured at one side of the front surface portion to determine the contacting condition with the casting block according to the variation of air pressure.

2. The jig device of claim 1, wherein the center guider includes a center block that is disposed in the middle of the mounting portion and a guide pad that is respectively mounted on both sides of the upper part of the center block.

3. The jig device of claim 1, wherein
    the base surface plate cylinder is mounted on the rear surface of the main frame;
    the one or more upper and lower back/forth plates are disposed on the upper and lower center of the front surface portion to be connected to an operating rod of the base surface plate cylinder through a connecting block inside the main frame such that it can move back and forth; and
    the plurality of shaft-shape base surface dogs that are configured in the front of the upper and lower back/forth plates to support the upper and lower part of the rear surface of the casting block.

4. The jig device of claim 1, wherein
    the side pad cylinder is mounted through a cylinder bracket of the one side of the main frame; and
    the side pad is mounted on the front end of the operating rod of the side pad cylinder to support the one side surface of the casting block.

5. The jig device of claim 1, wherein the lower lifting pad unit includes:
    both-side lifting cylinders that are respectively mounted at both sides of the front and rear of the mounting portion of the main frame; and
    a plurality of lower lifting pads that are configured at the mounting portion corresponding to both sides of the front and rear of the center guider to raise and lower the casting block through a cam operation according to the back and forth operation of the respective lifting cylinder in the main frame.

6. The jig device of claim 1, wherein
    the upper clamping cylinder that is configured at the center of the upper portion of the main frame;
    the both-side clamping shaft that is mounted inside the upper center of the front surface portion of the main frame such that the rear end thereof is connected to the front end of the operating rod of the upper clamping cylinder through a connecting bracket; and
    the both-side upper clampers that are connected to the front end of the both-side clamping shaft through a link structure to fix both sides of the upper part of the casting block through a hinge operation in a mounted position.

7. The jig device of claim 1, wherein the lower clamping unit includes:
    a lower clamping cylinder that is mounted at the lower center of the rear side of the main frame; and
    both-side lower clampers that are configured on the mounting portion corresponding to both sides of the center guider to be operated inside the main frame by the lower clamping cylinder so as to fix both sides of the casing block.

8. The jig device of claim 1, wherein
    the both-side sub-clamping cylinders are mounted on both sides of the front of the mounting portion; and
    the both-side sub-clampers are mounted on the front end of the operating rod of the respective sub clamping cylinder to fix both sides of the front upper part of the casting block.

9. The jig device of claim 1, wherein the base surface pad unit includes:
    a mounting shaft that penetrates through the center of the front surface to the rear and has an air pressure hole formed along the axis thereof and an exhaust hole formed at the front end thereof;
    a nozzle that is mounted at the center of the front end of the mounting shaft and has a nozzle air pressure hole therein connected to the air pressure hole and a nozzle exhaust hole therein connected to the exhaust hole ;
    a cover that is mounted on the front center of the end of the mounting shaft to cover the nozzle;
    a pad shaft that penetrates the center of the cover and has the rear end thereof corresponding to the nozzle air pressure hole of the nozzle and the front end thereof corresponding to the rear of the casting block; and
    a return spring that supports the pad shaft frontward in the cover.

* * * * *